(12) United States Patent
Kajihara et al.

(10) Patent No.: US 9,716,950 B2
(45) Date of Patent: Jul. 25, 2017

(54) DIAPHRAGM, LOUDSPEAKER USING SAME, AND ELECTRONIC DEVICE AND MOBILE DEVICE USING LOUDSPEAKER

(71) Applicant: Panasonic Intellectual Property Management Co., Ltd., Osaka (JP)

(72) Inventors: Yoshimichi Kajihara, Okayama (JP); Yohei Jin, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/022,206

(22) PCT Filed: Oct. 6, 2014

(86) PCT No.: PCT/JP2014/005071
§ 371 (c)(1),
(2) Date: Mar. 15, 2016

(87) PCT Pub. No.: WO2015/056419
PCT Pub. Date: Apr. 23, 2015

(65) Prior Publication Data
US 2016/0234600 A1 Aug. 11, 2016

(30) Foreign Application Priority Data

Oct. 15, 2013 (JP) .................................. 2013-214490
Aug. 4, 2014 (JP) .................................. 2014-158311

(51) Int. Cl.
*H04R 1/00* (2006.01)
*H04R 7/06* (2006.01)
(Continued)

(52) U.S. Cl.
CPC ............... *H04R 7/06* (2013.01); *B32B 29/02* (2013.01); *H04R 7/125* (2013.01); *H04R 9/06* (2013.01);
(Continued)

(58) Field of Classification Search
CPC . H04R 7/06; H04R 7/125; H04R 9/06; H04R 2307/027; H04R 2307/025;
(Continued)

(56) References Cited

U.S. PATENT DOCUMENTS 5,581,053 A * 12/1996 Suzuki ................... G10K 13/00
181/167
6,390,232 B1 * 5/2002 Kirschbaum .......... H04R 7/127
181/166
(Continued)

FOREIGN PATENT DOCUMENTS

JP 61-035094 2/1986
JP 61-232796 10/1986
(Continued)

OTHER PUBLICATIONS

The Extended European Search Report dated Aug. 24, 2016 for the related European Patent Application No. 14853446.4.
(Continued)

*Primary Examiner* — Tuan D Nguyen
(74) *Attorney, Agent, or Firm* — McDermott Will & Emery LLP

(57) ABSTRACT

The diaphragm has a paper base layer and a papermaking layer. The papermaking layer is formed on a surface of the paper base layer. The paper base layer contains natural fibers and thermoplastic resin, and is formed by a papermaking process with a mixture of the natural fibers and the resin. The papermaking layer, contains fibers each having a tensile
(Continued)

elastic modulus of 150 GPa or greater, and is formed by a papermaking process with the fibers.

15 Claims, 9 Drawing Sheets

(51) Int. Cl.
H04R 7/12 (2006.01)
B32B 29/02 (2006.01)
H04R 9/06 (2006.01)
H04R 31/00 (2006.01)

(52) U.S. Cl.
CPC ... B32B 2260/021 (2013.01); B32B 2260/046 (2013.01); B32B 2262/103 (2013.01); B32B 2262/106 (2013.01); B32B 2307/51 (2013.01); B32B 2307/54 (2013.01); B32B 2307/7265 (2013.01); B32B 2457/00 (2013.01); H04R 31/003 (2013.01); H04R 2307/025 (2013.01); H04R 2307/027 (2013.01); H04R 2307/029 (2013.01); H04R 2499/11 (2013.01); H04R 2499/13 (2013.01)

(58) Field of Classification Search
CPC . H04R 2499/11; H04R 2499/13; B32B 29/02; B32B 2307/7265; B32B 2262/103; B32B 2260/021; B32B 2260/046; B32B 2457/00; B32B 2262/106; B32B 2307/54
See application file for complete search history.

(56) References Cited

U.S. PATENT DOCUMENTS

| 2002/0140136 | A1* | 10/2002 | Ishigaki ............ H04R 31/003 264/624 |
| 2005/0051380 | A1 | 3/2005 | Takayama et al. |
| 2013/0039515 | A1 | 2/2013 | Jin et al. |
| 2013/0301867 | A1 | 11/2013 | Jin et al. |

FOREIGN PATENT DOCUMENTS

| JP | 63-102596 | 5/1988 |
| JP | 1-293798 | 11/1989 |
| JP | 2005-080098 | 3/2005 |
| JP | 2005-347907 | 12/2005 |
| JP | 2012-227582 | 11/2012 |

OTHER PUBLICATIONS

International Search Report of PCT application No. PCT/JP2014/005071 dated Nov. 11, 2014.

* cited by examiner

DIAPHRAGM, LOUDSPEAKER USING SAME, AND ELECTRONIC DEVICE AND MOBILE DEVICE USING LOUDSPEAKER

CROSS-REFERENCE TO RELATED APPLICATIONS

This application is a U.S. national stage application of the PCT International Application No. PCT/JP2014/005071 filed on Oct. 6, 2014, which claims the benefit of foreign priority of Japanese patent applications 2013-214490 filed on Oct. 15, 2013 and 2014-158311 filed on Aug. 4, 2014, the contents all of which are incorporated herein by reference.

TECHNICAL FIELD

The present invention relates to a diaphragm for a loudspeaker used for various types of electronic devices, and an electronic device and a mobile device using the loudspeaker.

BACKGROUND ART

An example of conventional diaphragms for loudspeaker contains natural fibers and mica. A mica-contained diaphragm has high rigidity. Such a diaphragm is made by a papermaking process using, for example, natural fibers and mica mixed into water (see PTL 1, for example).

CITATION LIST

Patent Literature

PTL 1: Japanese Unexamined Patent Application Publication No. S63-102596

SUMMARY OF THE INVENTION

The diaphragm of the present invention contains a paper base layer and a papermaking layer laminated on the paper base layer. The paper base layer contains natural fibers and thermoplastic resin. The papermaking layer contains fibers each having a tensile elastic modulus of 150 GPa or greater.

In the structure mentioned above, the papermaking layer containing fibers with high tensile elastic modulus is formed by papermaking on the surface of the paper base layer. Such structured diaphragm has high elastic modulus. Further, the paper base layer is formed by papermaking with the mixture of the natural fibers and the thermoplastic resin, allowing the whole structure of the diaphragm to be lightweight. Such structured diaphragm offers an improved sound pressure level and an increased high-band limit frequency. That is, a loudspeaker using the diaphragm offers excellent sound quality.

DESCRIPTION OF EMBODIMENT

Prior to description of a diaphragm of the exemplary embodiment, the trend in characteristics demanded on loudspeakers mounted to electronic devices will be described first. The electronic devices include audio visual (AV) products such as a mini component stereo system and a television, and mobile devices such as a smart phone and a tablet type device. By virtue of digitalization of sound sources, the electronic devices of a recent model can reproduce sounds with excellent quality. To respond the trend, for example, loudspeakers need to achieve a wide band of reproduction frequencies, a wide dynamic range, and low distortion.

For instance, a loudspeaker designed to produce high audio frequencies (hereinafter, a tweeter) has a large affect on the sound quality in a high frequency range. That is, a tweeter having high limit-frequency in the high frequency range is needed. In contrast, a loudspeaker that reproduces sounds of audio frequency ranges from low to high (hereinafter, a full-range speaker) is required to reproduce sound in wider frequency ranges. That is, a full-range speaker having a high limit-frequency in the high frequency range is needed. In a loudspeaker, a diaphragm has the most profound effect on the demanded characteristics above. Therefore, a diaphragm having high limit-frequency in the high frequency range is needed. To satisfy the demand, the diaphragm needs to be lightweight and to have high rigidity. Such structured diaphragm has an improved sound level and increased high-band limit frequency.

Figure 1:
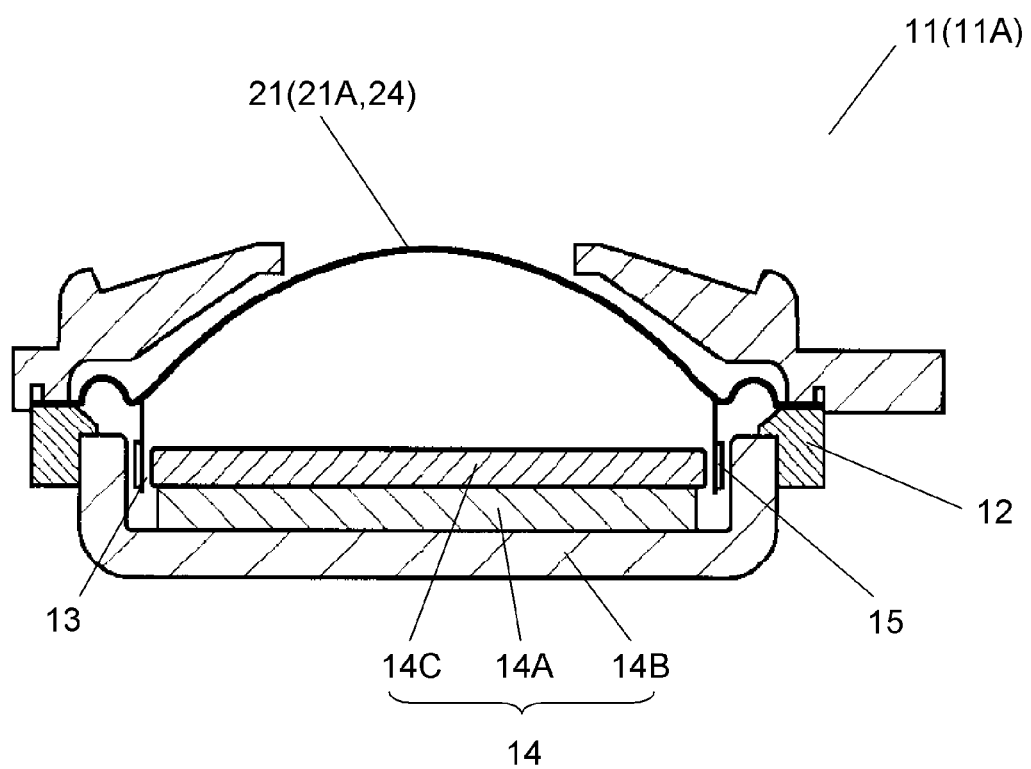
FIG. 1 is a cross-sectional view of a loudspeaker in accordance with an exemplary embodiment of the present invention.
Figure 2:
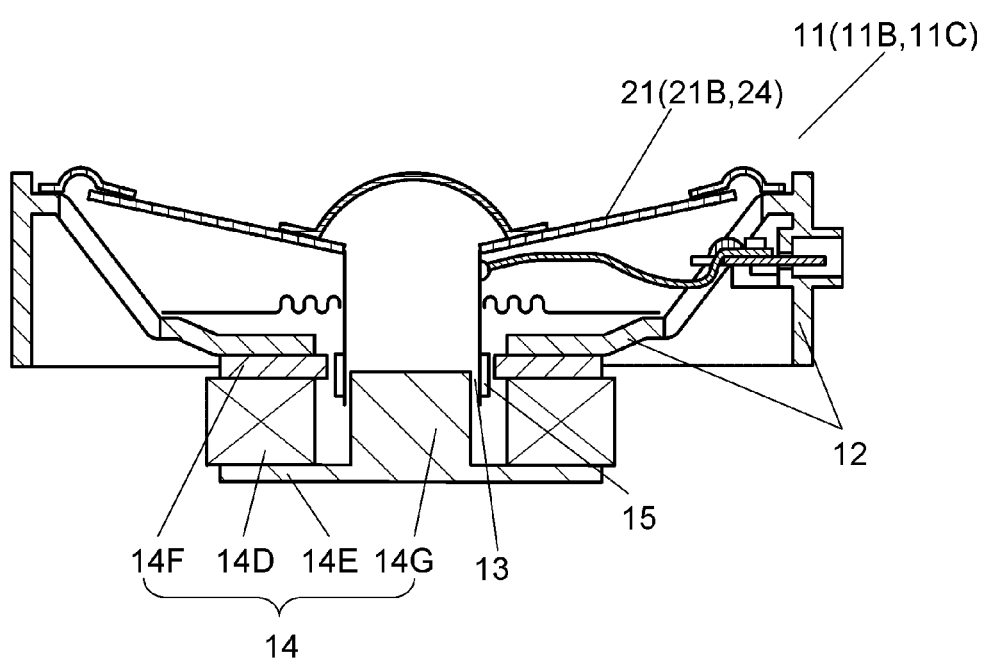
FIG. 2 is a cross-sectional view of another loudspeaker in accordance with the exemplary embodiment of the present invention.

Hereinafter, lightweight and highly rigid loudspeaker 11 of the exemplary embodiment will be described with reference to FIG. 1 and FIG. 2. FIG. 1 is a cross-sectional view of loudspeaker 11. FIG. 2 is a cross-sectional view of another example of loudspeaker 11. Loudspeaker 11 has frame 12, magnetic circuit 14 provided with magnetic gap 13, voice coil 15, and diaphragm 21. Magnetic circuit 14 is connected to frame 12.

FIG. 1 shows a structure where magnetic circuit 14 is accommodated in frame 12. As shown in FIG. 2, magnetic circuit 14 may be connected to a central section on the rear side of frame 12.

Preferably, magnetic circuit 14 is of an internal magnetic type, as shown in FIG. 1. The structure allows loudspeaker 11 to be compact. In this case, magnetic circuit 14 contains magnet 14A, yoke 14B, and plate 14C. Magnet 14A is sandwiched between yoke 14B and plate 14C. Yoke 14B has an inner surface that faces a side surface of plate 14C. Magnetic gap 13 is formed between the side surface of plate 14C and the inner surface of yoke 14B.

Magnetic circuit 14 is not limited to the internal magnetic type, and may be of an external magnetic type shown in FIG. 2. In this case, magnetic circuit 14 contains magnet 14D, yoke 14E, and plate 14F. Yoke 14E has center pole 14G disposed in the center thereof. Plate 14F is annular. Magnet 14D is disposed between yoke 14E and plate 14F. In the structure, the inner side-surface of plate 14F faces the outer peripheral surface of center pole 14G. Magnetic gap 13 is formed between the inner side-surface of plate 14F and the outer peripheral surface of center pole 14G. Further, magnetic circuit 14 may have a combined structure of an internal magnetic type and an external magnetic type.

Voice coil 15 has first and second ends. The first end is connected to diaphragm 21, while the second end is inserted into magnetic gap 13.

Diaphragm 21 has a front surface and a rear surface opposite to the front surface. The outer peripheral section of diaphragm 21 is connected to the outer peripheral section of frame 12. Diaphragm 21 may contain an edge. Diaphragm 21 may be either dome-type diaphragm 21A shown in FIG. 1 or cone-type diaphragm 21B shown in FIG. 2. The central part of dome-type diaphragm 21A protrudes toward the front surface, as shown in FIG. 1. Dome-type diaphragm 21A may contain a recess like a bowl in the central part. In that case, the bowl-like recess is bowed toward the rear surface of loudspeaker 11. On the other hand, cone-type diaphragm 21B has a shape of a horn being wider on the front side, as shown in FIG. 2.

Figure 3:
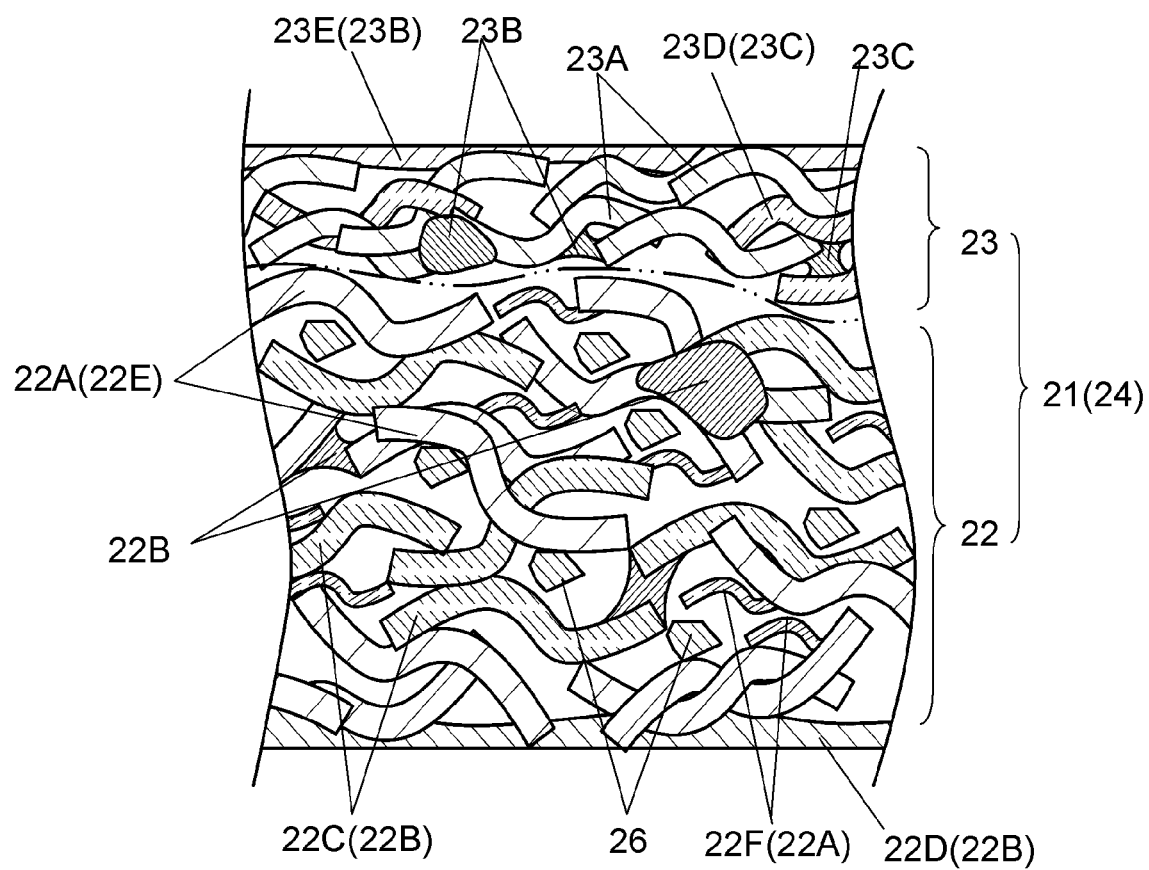
FIG. 3 is a schematic cross-section view of a diaphragm in accordance with the exemplary embodiment of the present invention.
Figure 4:
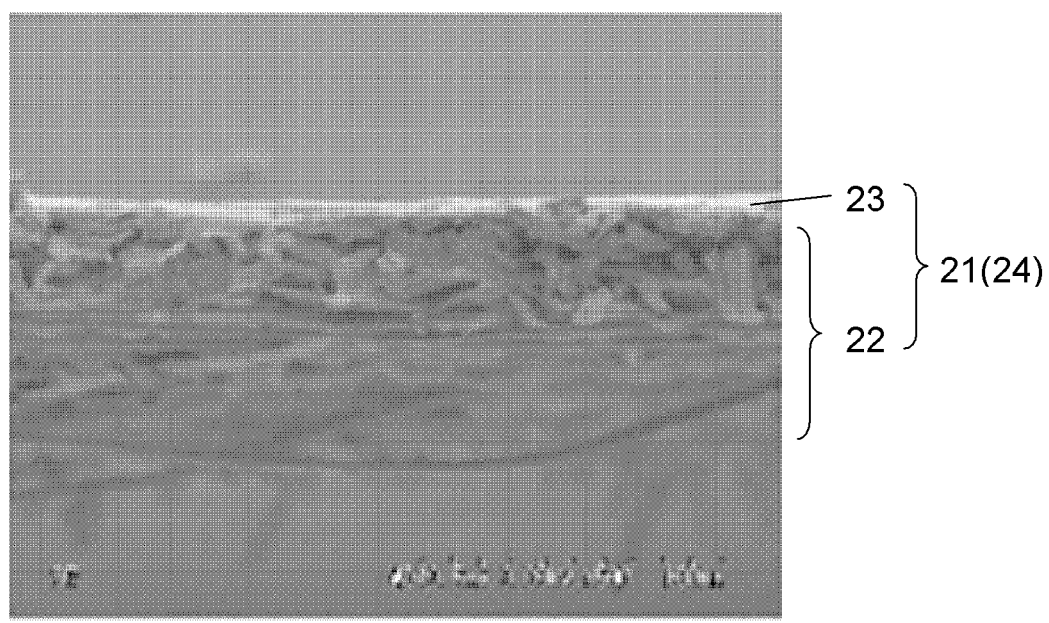
FIG. 4 shows a cross section, observed by a scanning electron microscope (SEM), of the diaphragm shown in FIG. 3.

Next, diaphragm 21 will be described with reference to FIG. 3 and FIG. 4. FIG. 3 is a schematic cross-sectional view of diaphragm 21. FIG. 4 shows a cross section, observed by a scanning electron microscope (hereinafter, SEM), of diaphragm 21. Diaphragm 21 has paper base layer 22 and papermaking layer 23. Papermaking layer 23 is laminated on the surface of paper base layer 22. Paper base layer 22 contains natural fibers 22A and thermoplastic resin 22B. Paper base layer 22 is made by a paper-making process using natural fibers 22A and resin 22B that are mixed and dispersed in water (hereinafter, produced through the paper-making process). Preferably, resin 22B is chemical fibers 22C.

Papermaking layer 23 contains fibers 23A each having a tensile elastic modulus of 150 GPa or greater. Papermaking layer 23 is by a paper-making process using fibers 23A dispersed in water (hereinafter, produced through a paper-making process).

Next, the paper-making process of natural fibers 22A and resin 22B, and that of fibers 23A in manufacturing diaphragm 21 are briefly described. In manufacturing paper base layer 22, first, natural fibers 22A and resin 22B are put into water and a dispersion liquid thereof is prepared. The dispersion liquid is filtrated through a mesh and drained. The precursor to paper base layer 22 is thus prepared. The precursor to paper base layer 22 is then heated and pressed. Through the process, paper base layer 22 is formed.

The manufacturing process of papermaking layer 23 is the same as that of paper base layer 22. As for the manufacturing process of papermaking layer 23, the precursor to papermaking layer 23 is prepared by using fibers 23A, instead of natural fibers 22A and resin 22B.

The structure in which papermaking layer 23 is formed on the surface of paper base layer 22 allows diaphragm 21 to have an enhanced elastic modulus. Further, paper base layer 22 is light since it contains natural fibers 22A. Paper base layer 22 is formed by a paper-making process and a clearance is formed between natural fibers 22A. Thus, the structure further reduces the weight of diaphragm 21. As a result, diaphragm 21 offers an improved sound pressure level and an increased high-band limit frequency. Further, diaphragm 21 has a laminated structure of paper base layer 22 and papermaking layer 23. The structure provides diaphragm 21 with an improved degree of internal loss. The structure therefore suppresses generation of a peak and a clip in frequency response in the mid- to high-frequency ranges.

Each of loudspeakers 11 having diaphragm 21 shown in FIG. 1 and FIG. 2 reproduces an excellent sound. Further, the enhanced elastic modulus of diaphragm 21 increases transmission efficiency of vibration from voice coil 15 to diaphragm 21. Diaphragm 21 particularly offers high limit-frequency.

As paper base layer 22 contains resin 22B, diaphragm 21 has high internal loss. Compared to a diaphragm formed of paper alone, diaphragm 21 has a small transient response of sound fed therefrom, reproducing a sound source with high fidelity.

Further, employing chemical fibers 22C as resin 22B increases entanglement between chemical fibers 22C and between chemical fibers 22C and natural fibers 22A. This further enhances rigidity of diaphragm 21. Besides, controlling the mixing ratio of natural fibers 22A and resin 22B allows diaphragm 21 to have internal loss of a desired value. The internal loss of diaphragm 21 can also be determined to a desired value by combination of materials employed for natural fibers 22A and resin 22B.

Although FIG. 3 shows a structure in which papermaking layer 23 is formed on one surface of paper base layer 22, it is not limited to; papermaking layers 23 may be formed on both surfaces of paper base layer 22. Such a structure further increases elastic modulus of diaphragm 21.

It is preferable that paper base layer 22 has a thickness of not less than 0.05 mm and not more than 0.2 mm, while papermaking layer 23 has a thickness of not less than 0.05 mm and not more than 0.15 mm. In determining the thickness above, the thickness ratio of paper base layer 22 with respect to papermaking layer 23 is preferably not less than 1 and not more than 10; more preferably, not more than 8.

Next, papermaking layer 23 will be described. It is preferable that fibers 23A are carbon fibers. Carbon fibers have tensile elastic modulus of 200 GPa or greater. Besides, carbon fibers have a specific gravity of 1.76, that is, very light. Fibers 23A are not limited to carbon fibers; they may be metallic fibers. Further, fibers 23A may contain carbon fibers and metallic fibers. The aforementioned metallic fibers are formed of, for example, alumina, stainless, and titanium. Further, oxidized metallic materials may be employed for fibers 23A. As for fibers 23A, one kind of material may be selected from above or two-or-more kinds of material may be selected and mixed with each other.

When carbon fibers are employed as the main fiber of papermaking layer 23, preferably, papermaking layer 23 contains a small amount of metallic fibers as a subordinate fiber; or the subordinate fiber may contain chemically synthetic fibers. The structure enhances binding force at the boundary between papermaking layer 23 and paper base layer 22. Papermaking layer 23 may contain both of synthetic fibers and a small amount of metallic fibers as the subordinate fiber.

Papermaking layer 23 preferably contains resin 23B. When resin 22B of paper base layer 22 is melted by thermal pressing, it often flows into a clearance between fibers 23A of papermaking layer 23, thereby resin 23B is formed in papermaking layer 23. In such a manner, resin 23$b$ is formed. In the structure, resin 23B sticks to fibers 23A. That is, resin 23B works as a bridge between fibers 23A; in other words, resin 23B can fill a clearance between fibers 23A. Therefore, the structure enhances elastic modulus of papermaking layer 23; accordingly, diaphragm 21 has an enhanced elastic modulus.

Preferably, papermaking layer 23 further contains thermoplastic resin 23C. Resin 23C can be contained in papermaking layer 23 such that the precursor to papermaking layer 23 is formed from fibers 23A and resin 23C dispersed in water. When heated, resin 23C melts and sticks to fibers 23A. That is, resin 23C works as a bridge between fibers 23A; in other words, resin 23C can fill a clearance between fibers 23A. Therefore, the structure enhances elastic modulus of papermaking layer 23; accordingly, diaphragm 21 has an enhanced elastic modulus.

Furthermore, the bonding between resin 22B contained in paper base layer 22 and resin 23C contained in papermaking layer 23 enhances the bonding strength between paper base layer 22 and papermaking layer 23. This enhances elastic modulus of diaphragm 21, thereby decreasing transmission loss in the sound fed from diaphragm 21.

The content of resin 23C with respect to the total weight of papermaking layer 23 is preferably not less than 10 wt % and not more than 50 wt %. It is also preferable that resin 22B and resin 23C are the same material. The structure above increases the bonding strength between paper base layer 22 and papermaking layer 23, thereby enhancing elastic modulus of diaphragm 21.

Resin 23C preferably contains chemical fibers 23D. In the structure, chemical fibers 23D are tangled with fibers 23A, and also have tangles in themselves, thereby enhancing elastic modulus of diaphragm 21. Besides, a part of chemical fibers 23D melts by thermal pressing and sticks to fibers 23A. Therefore, chemical fibers 23D work as a bridge between fibers 23A. Alternatively, chemical fibers 23D can also fill a clearance between fibers 23A. Therefore, the structure enhances elastic modulus of papermaking layer 23; accordingly, diaphragm 21 has an enhanced elastic modulus. Resin 23C also can be formed by melting chemical fibers 23D by heat.

More preferably, papermaking layer 23 contains resin 22B and resin 23C. With this structure, the bonding force between resin 22B and resin 23C further enhances elastic modulus of papermaking layer 23; accordingly, enhances elastic modulus of diaphragm 21.

Further, papermaking layer 23 preferably includes skin layer 23E formed of resin 23C in its surface region. A part of skin layer 23E is embedded in papermaking layer 23 by resin 23C; that is, resin 23C fills a clearance between fibers 23A. The structure further increases rigidity of papermaking layer 23. In addition, it suppresses fluffing of fibers 23A on the surface of papermaking layer 23. The structure further provides the surface of papermaking layer 23 with enhanced smoothness, contributing to good-looking exterior of diaphragm 21 seen from the front side.

Next, paper base layer 22 will be described. Paper base layer 22 contains natural fibers 22A and resin 22B. Preferably, the beating degree of natural fibers 22A, which is measured by a Canadian standard freeness tester, is not less than 200 ml and not more than 700 ml. With this structure, natural fibers 22A tangle with each other, so that natural fibers 22A form the framework of diaphragm 21. This increases rigidity of diaphragm 21. Moreover, as the beating degree of natural fibers 22A is 200 ml or greater, the water-filtrating rate (speed) in the papermaking process can be increased. That is, diaphragm 21 has improvement in productivity. In a case where chemical fibers 22C is contained as resin 22B, entanglement between chemical fibers 22C and natural fibers 22A is increased; thus, diaphragm 21 has further enhanced rigidity.

It is preferable that natural fibers 22A have a fiber length of not less than 0.8 mm and not more than 3 mm. Natural fibers 22A with a fiber length of 0.8 mm or longer have high rigidity; accordingly, diaphragm 21 obtains high rigidity. Natural fibers 22A with a fiber length of 3 mm or shorter easily have uniform dispersion in water, thereby suppressing non-uniform distribution of natural fibers 22A in paper base layer 22. As a result, diaphragm 21 suppresses generation of unwanted resonant sound.

The content of natural fibers 22A with respect to the total weight of paper base layer 22 is preferably not less than 10 wt % and not more than 90 wt %; more preferably, not less than 10 wt % and not more than 70 wt %. The content of natural fibers 22A of 10 wt % or greater increases rigidity of diaphragm 21, so that diaphragm 21 outputs powerful sounds. The content of natural fibers 22A to be 90 wt % or lower increases flexibility in shape of diaphragm 21. for instance, when diaphragm 21 is dome type diaphragm 21A, the height of the dome can be increased; therefore, dome type diaphragm 21A has an increased rigidity; and as a result, dome type diaphragm 21A has an increased high limit frequency. Furthermore, dome type diaphragm 21A has less distortion.

Fibers processed from wood or non-wood plants can be used as the material of natural fibers 22A. The wood plants include, for example, needle-leaved trees, broad-leaved trees. The non-wood plants include, for example, bamboos, bananas, pineapples, bamboo grasses, kenaf, jute, bagasse, manila, and gampi. To obtain desired characteristics and sound quality of diaphragm 21, one kind selected from the materials above or two or more kinds (to be mixed with each other) selected therefrom can be employed for natural fibers 22A.

For example, when needle-leaved trees or broad-leaved trees are employed as natural fibers 22A, diaphragm 21 offers high internal loss and excellent sound quality. In that case, compared to a diaphragm formed of metallic material, diaphragm 21 suppresses peak generation particularly in the mid-to-low sound range.

For example, employing fibers made from non-wood plants as natural fibers 22A suppresses exhaustion of wood resources. That is, employing natural fibers 22A of non-wood plants suppresses global ecological damage.

In particular, as for natural fibers 22A, fibers made from bamboo (hereinafter, bamboo fibers 22E) is preferably employed. When bamboo-made diaphragm 21 is incinerated, carbon dioxide which the bamboo had taken from the air into the body during its growing process goes back in the air. Thus, compared to a diaphragm made from fossil fuel, diaphragm 21 using bamboo fibers 22E suppresses increase in a carbon dioxide gas.

Generally, bamboo takes about 50 days from budding to be a matured plant. Employing bamboo of one year old or older for diaphragm 21 suppresses exhaustion of woods (or wood as a material). Further, as bamboo has high fertility, an untreated bamboo grove hampers the growth of a neighborhood plants. Using bamboo with the above circumstance for industrial material suppresses the harmful effect of bamboo grove on the growth of other plants. Further, bamboo fibers 22E, which is made from bamboo of one year old or older, has stability in elastic modulus and internal loss that are required as diaphragm 21. Therefore, generation of variation in sound characteristics is suppressed by manufacturing diaphragm 21 with use of bamboo fibers 22E that is made from bamboo of one year old or older.

The content of lignin in bamboo fibers 22E with respect to the total weight of bamboo fibers 22E is preferably not less than 0.5 wt % and not more than 20 wt %. If the content of lignin exceeds 20 wt %, the surface region of bamboo fibers 22E contains an excessive amount of lignin, which hampers the bonding between bamboo fibers 22E derived from hydrogen bonding, resulting in poor strength of diaphragm 21. if bamboo fibers 22E excessively contain lignin, it becomes hard to retain the shape of diaphragm 21. the content of lignin of bamboo fibers 22E to be 20 wt % or less increases the value of internal loss of diaphragm 21. therefore, generation of peaks and dips (caused by diaphragm 21) in the mid- to high-frequency ranges of loudspeaker 11 can be suppressed.

Natural fibers 22A preferably contains microfibrillated microstructual bamboo fibers 22F. The content of microstructual bamboo fibers 22F with respect to the total weight of paper base layer 22 is preferably not less than 1 wt % and not more than 30 wt %. Microstructual bamboo fibers 22F function as a binder that makes natural fibers 22A stick together, which increases rigidity of diaphragm 21. Furthermore, as the content of microstructual bamboo fibers 22F is 30 wt % or less, degradation in dispersing quality of natural fibers 22A in the papermaking process can be suppressed. Moreover, a cause of disfigurement, offering a good-looking appearance of diaphragm 21 can also be suppressed. In contrast, if the content of microstructual bamboo fibers 22F is greater than 30 wt %, water-filtrating in the papermaking process of natural fibers 22A needs a prolonged time for, thereby increasing the production cost of diaphragm 21.

Preferably, each of microstructual bamboo fibers 22F has a fiber length of not less than 0.1 mm and not more than 0.8 mm. The structure enhances rigidity of diaphragm 21. More preferably, the beating degree of microstructual bamboo fibers 22F is 200 ml or less. If diaphragm 21 employs microstructual bamboo fibers 22F with a beating degree greater than 200 ml, diaphragm 21 does not have performances much different from a diaphragm that employs general bamboo fibers 22E. That is, containing microstructual bamboo fibers 22F with a beating degree of 200 ml or less allows diaphragm 21 to have further enhanced rigidity.

Further, paper base layer 22 may contain reinforcing material 26 as needed. For example, filling material, inorganic fibers, a waterproof agent, and pigment can be employed as reinforcing material 26. Reinforcing material 26 can be selected from the materials above according to desired characteristics and sound quality. Among the materials above, one kind or a combination of two-or-more kinds may be used for reinforcing material 26. For example, aramid fibers, carbon fibers, and aluminum hydroxide can be employed as reinforcing material 26.

In a case where paper base layer 22 contains aramid fibers or carbon fibers as reinforcing material 26, elastic modulus of diaphragm 21 is increased. In that case, the additive amount of reinforcing material 26 with respect to the total weight of paper base layer 22 is preferably not less than 1 wt % and not more than 45 wt %. With this content ratio, diaphragm 21 has an improved elastic modulus. If the content of reinforcing material 26 is less than 1 wt %, reinforcing material 26 has little effect on reinforcement. The content of reinforcement material 26 to be 45 wt % or less suppresses lack uniformity of dispersion of reinforcing material 26 in diaphragm 21; further, it suppresses increase in specific gravity of diaphragm 21.

In a case where paper base layer 22 contains aluminum hydroxide as reinforcing material 26, the additive amount of reinforcing material 26 with respect to the total weight of paper base layer 22 is preferably not less than 30 wt % and not more than 70 wt %. As paper base layer 22 contains aluminum hydroxide of 30 wt % or more, flame retardance of paper base layer 22 can be enhanced. If the content of reinforcing material 26 exceeds 70 wt %, it is difficult to form paper base layer 22.

It is preferable that paper base layer 22 has a density of not less than 0.25 g/cm$^3$ and not more than 1.00 g/cm$^3$. The density of paper base layer 22 can be controlled to a desired value by selecting material to be used in the following materials and adjusting the content of a material selected therefrom: microstructual bamboo fibers 22F and other subordinate materials, reinforcing material 26, natural fibers 22A, and resin 22B. As paper base layer 22 has the density of 0.25 g/cm$^3$ or more, rigidity of diaphragm 21 is increased; accordingly, distortion of sound fed from diaphragm 21 is decreased. In particular, distortion in a high-tone range is suppressed. Further, as paper base layer 22 has the density of 1.00 g/cm$^3$ or less, diaphragm 21 can be lighter than a diaphragm made of resin. Therefore, decrease in sound pressure of sounds fed from diaphragm 21 can be suppressed.

As described earlier, resin 22B preferably contains chemical fibers 22C. In the structure, chemical fibers 22C can be tangled with natural fibers 22A, and also have tangles in themselves, which enhances rigidity of diaphragm 21. Resin 22B can be formed by melting chemical fibers 22C by heat.

Chemical fibers 22C may have been partly melted, and the melted part of chemical fibers 22C preferably sticks to other parts of chemical fibers 22C and/or natural fibers 22A. Under the condition, the melted part of chemical fibers 22C works as a bridge between chemical fibers 22C, between natural fibers 22A, and between chemical fibers 22C and natural fibers 22A. Therefore, the structure increases rigidity of diaphragm 21.

Figure 5:
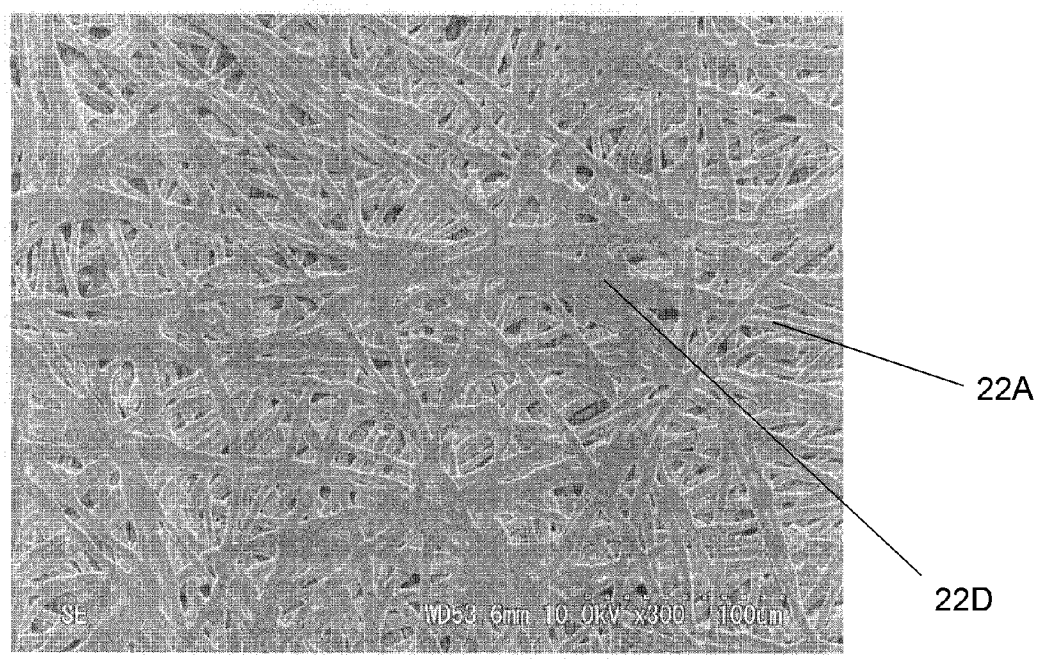
FIG. 5 shows the surface of a paper base layer, observed by an SEM, of the diaphragm shown in FIG. 3.
Figure 6:
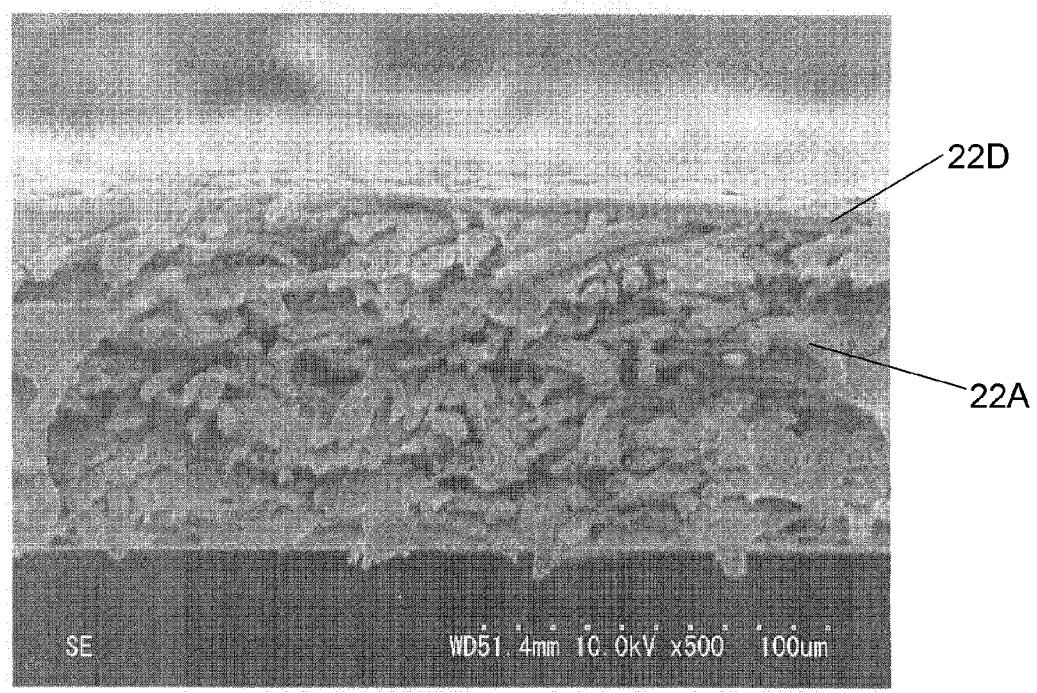
FIG. 6 shows a cross section of a skin layer, observed by an SEM, of the diaphragm shown in FIG. 3.

Next, skin layer 22D formed in paper base layer 22 will be described with reference to FIG. 3, FIG. 5, and FIG. 6. FIG. 5 is an SEM image showing the surface of paper base layer 22. FIG. 6 is an SEM image showing a cross section of skin layer 22D. As shown in FIG. 3, paper base layer 22 preferably contains skin layer 22D formed of resin 22B. Skin layer 22D formed of resin 22B is preferably formed in paper base layer 22 on the side opposite to papermaking layer 23. Skin layer 22D contains resin 22B that works as a bridge between natural fibers 22A, thereby increasing rigidity of paper base layer 22. The structure therefore allows diaphragm 21 to have reduced distortion and increased limit frequency in the high-frequency range.

Compared to a diaphragm formed of a single metallic material, diaphragm 21 has an enhanced value of internal loss. Further, compared to a diaphragm formed of a single resin material, diaphragm 21 is lighter and has high elastic modulus, thereby improving sound pressure and expanding reproduction range.

Generally, the phase difference between the sound fed toward the rear side of a diaphragm and the sound fed toward the front side of the diaphragm is approximately 180°. In a diaphragm that allows air to pass through easily, the output sound on the rear side of the diaphragm mixes with the output sound on the front side of the diaphragm, which creates distortion in the sound. In contrast, diaphragm 21 has skin layer 22D and therefore has small air permeability. This suppresses the output sound on the rear side of diaphragm 21 from mixing with the output sound on the front side of diaphragm 21. Therefore, the structure allows diaphragm 21 to have further reduced distortion and further improved sound pressure level. Furthermore, the structure allows diaphragm 21 to have reduced sound distortion caused by air leakage and to have improved moisture resistance and water resistance.

It is more preferable that skin layer 22D contains resin 22B that fills the clearance between natural fibers 22A, the clearance between chemical fibers 22C, and the clearance between natural fibers 22A and chemical fibers 22C.

For example, polyester resin, polyolefin resin, and acrylic resin can be employed for resin 22B, 23B, and 23C. Among the materials above, one kind of material may be selected for use, or two or more kinds of material may be mixed with each other.

Further, as for resin 22B, 23B, and 23C, polyester resin such as polyethylene terephthalate (hereinafter, PET), polyethylene naphthalate (hereinafter, PEN), and polylactate can be employed. Using the materials above suppresses occurrence of pinhole in diaphragm 21 and therefore suppresses air leakage of diaphragm 21, resulting in reduced sound distortion of diaphragm 21. Further, compared to a diaphragm formed of natural fibers 22A alone, diaphragm 21 employing the aforementioned materials has progressive improvement in rigidity, offering expanded reproduction range.

Employing polyolefin resin for resin 22B, 23B, 23C and chemical fibers 22C allows diaphragm 21 to have improvement in internal loss, which reduces unwanted distortion in sound of diaphragm 21. Employing acrylic resin for resin 22B, 23B, and 23C allows diaphragm 21 to have improvement in elastic modulus, which reduces unwanted distortion in sound of diaphragm 21. Employing PEN for resin 22B, 23B, and 23C allows diaphragm 21 to have improvement in rigidity and in internal loss. Employing polylactate for resin 22B, 23B, and 23C allows diaphragm 21 to have improvement in rigidity. In particular, when the polylactate is derived from natural material, diaphragm 21 contributes to suppressing environmental destruction.

It is preferable that chemical fibers 22C undergoes beating, like natural fibers 22A. Providing chemical fibers 22C with beating increases the surface area of chemical fibers 22C. This increases the tangles between chemical fibers 22C, and between chemical fibers 22C and natural fibers 22A, resulting in enhanced rigidity of diaphragm 21.

In diaphragm 21 shown in FIG. 1 and FIG. 2, papermaking layer 23 is preferably formed on the surface to which voice coil 15 is connected. Such structured diaphragm 21 has enhanced rigidity of the surface to which voice coil 15 is connected, thereby enhancing transmission efficiency of vibration from voice coil 15 to diaphragm 21. Therefore, diaphragm 21 has further increasing the limit frequency on the side of the high-frequency range.

As shown in FIG. 1, loudspeaker 11 may be, for example, tweeter 11A. In that case, diaphragm 21 is preferably dome-type diaphragm 21A, and voice coil 15 is preferably mounted on the rear side of dome-type diaphragm 21A. Accordingly, papermaking layer 23 shown in FIG. 3 is disposed in dome-type diaphragm 21A so as to face in the rear direction of tweeter 11A. Papermaking layer 23 may be formed on the front side of dome-type diaphragm 21A. Further, papermaking layers 23 may be disposed on both the front and rear sides of diaphragm 21.

Other than the dome shape, diaphragm 21 may be formed into a corn shape, as shown in FIG. 2. Loudspeaker 11 shown in FIG. 2 may be full-range speaker 11B or squawker 11C. In that case, diaphragm 21 is preferably corn-type diaphragm 21B.

Corn-type diaphragm 21B may contain a dust cap and a side corn; or diaphragm 21 may be a dust cap or a side corn. A dust cap and a side corn have an influence on reproduction characteristics of sound, in particular, in the high-frequency range. Such structured loudspeaker 11 reproduces sound in the high-frequency range with high fidelity.

In loudspeaker 11, voice coil 15 is connected to the front surface of corn-type diaphragm 21B. In FIG. 2, voice coil 15 seems to be connected to the rear surface of corn-type diaphragm 21B; in reality, voice coil 15 protrudes a little from the front surface of corn-type diaphragm 21B and the protruding part is bonded to the front surface of corn-type diaphragm 21B. It is therefore preferable that papermaking layer 23 shown in FIG. 3 is formed on the front surface of corn-type diaphragm 21B. Diaphragm 21 has a corn shape, but it may be formed into a dome shape as shown in FIG. 1.

Next, a method for manufacturing diaphragm 21 will be described in detail with reference to FIG. 3. The method for manufacturing diaphragm 21 includes a papermaking process and a heat-pressing process. The papermaking process includes a process for preparing the precursor to paper base layer 22 and a process for preparing the precursor to papermaking layer 23.

In the process for preparing the precursor to paper base layer 22, the precursor to paper base layer 22 is prepared by scooping natural fibers 22A and chemical fibers 22C dispersed in the water. Subordinate material such as microstructual bamboo fibers 22F, and reinforcing material 26 are mixed with natural fibers 22A and chemical fibers 22C in the process above and scooped together. In the precursor to paper base layer 22, the total basis weight of natural fibers 22A and chemical fibers 22C is preferably not less than 30 g/m$^2$ and not more than 90 g/m$^2$.

The dispersion liquid of natural fibers 22A and resin 22B is fed over a mesh, for example. Natural fibers 22A and resin 22B in the dispersion liquid are kept on the mesh as a deposition, while water passes through the mesh. That is, excess water included in the precursor to paper base layer 22 is removed, so that the deposition of natural fibers 22A and resin 22B is left on the mesh as the precursor to paper base layer 22.

At that time, the precursor to paper base layer 22 still contains water a little. Preferably, the precursor to paper base layer 22 is processed by vacuum suction from behind the mesh. The process further removes water from the precursor to paper base layer 22.

In the process for preparing the precursor to papermaking layer 23, the precursor to papermaking layer 23 is prepared by scooping fibers 23A dispersed in water. When chemical fibers 23D are employed, chemical fibers 23D are mixed with fibers 23A in the process. Preferably, the basis weight of fibers 23A in the precursor to papermaking layer 23 is not less than 10 g/m$^2$ and not more than 30 g/m$^2$.

The process for preparing the precursor to papermaking layer 23 is the same as that for preparing the precursor to paper base layer 22 except for using dispersion liquid of fibers 23A instead of dispersion liquid of natural fibers 22A and chemical fibers 22C.

Figure 7:
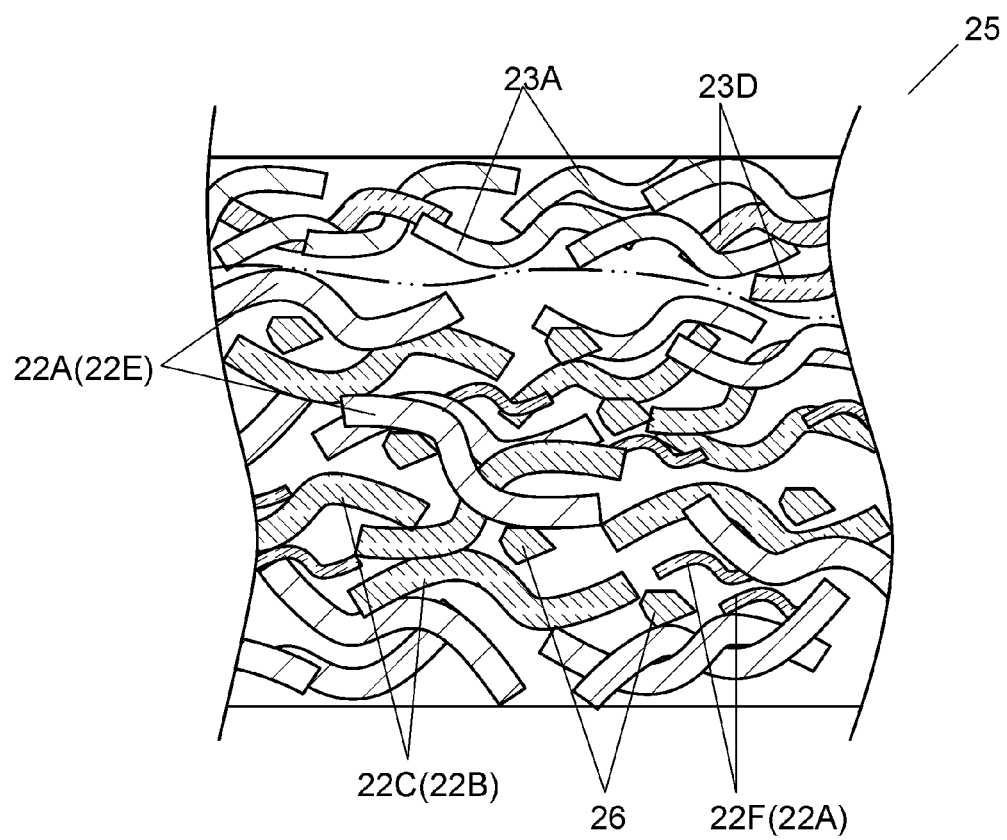
FIG. 7 is a schematic cross sectional view of a laminated structure as the precursor to the diaphragm shown in FIG. 3.

FIG. 7 schematically shows a laminated structure of the exemplary embodiment. The method for manufacturing diaphragm 21 may contain the process for manufacturing laminated structure 25. In the process for manufacturing laminated structure 25, the precursor to laminated structure 25 is prepared by stacking the precursor to paper base layer 22 and the precursor to papermaking layer 23 on one another. Such prepared precursor to laminated structure 25 is compressed by a roller to further remove water therefrom and to obtain a desired thickness, and after that, the precursor is dried. Laminated structure 25 is thus obtained.

The method for manufacturing diaphragm 21 shown in FIG. 3 has the process for manufacturing laminated structure 25, but it is not limited to. The precursor to laminated structure 25 may be formed by depositing fibers 23A over the precursor to papermaking layer 23 in the process for preparing the precursor to papermaking layer 23. In that case, the process where papermaking layer 23 is stuck on paper base layer 22 can be omitted.

It is preferable that laminated structure 25 is a dried flat plate; more preferably, it is wound in a roll shape. With the structure above, diaphragm 21 can be successively manufactured by heat-pressing. Laminated structure 25 is not limited to a flat plate; it may be formed in advance into a shape of diaphragm 21. In that case, it is preferably that the scooping mesh used in the papermaking process has a shape similar to diaphragm 21. Further, laminated structure 25 may be moist.

Next, in the heat-pressing process, laminated structure 25 shown in FIG. 7 is processed with application of heat and pressure, so that diaphragm 21 shown in FIG. 3 is obtained. The heat applied in the heat-pressing process fuses chemical fibers 22C and chemical fibers 23D to form resin 22B, resin 23B, and resin 23C, and the pressure applied in the process forms laminated structure 25 into a desired shape.

As shown in FIG. 1 and FIG. 2, diaphragm 21 is heat press-molded body 24 manufactured by heat-pressing. Heat press-molded body 24 is obtained by heat-pressing laminated structure 25 shown in FIG. 7. Through heat-pressing, thermoplastic resin 22B shown in FIG. 3 melts and sticks to natural fibers 22A, and melted resin 22B works as a bridge between natural fibers 22A. As a result, diaphragm 21 has further enhanced elastic modulus.

A mold used for the heat-pressing process includes the upper mold and the lower mold. In the process, the preset temperature of the upper mold is preferably different from that of the lower mold. With the setting of temperatures, skin layer 22D is formed on a surface of diaphragm 21 with which one of the upper mold and the lower mold having the higher preset temperature makes a contact.

Figure 8:
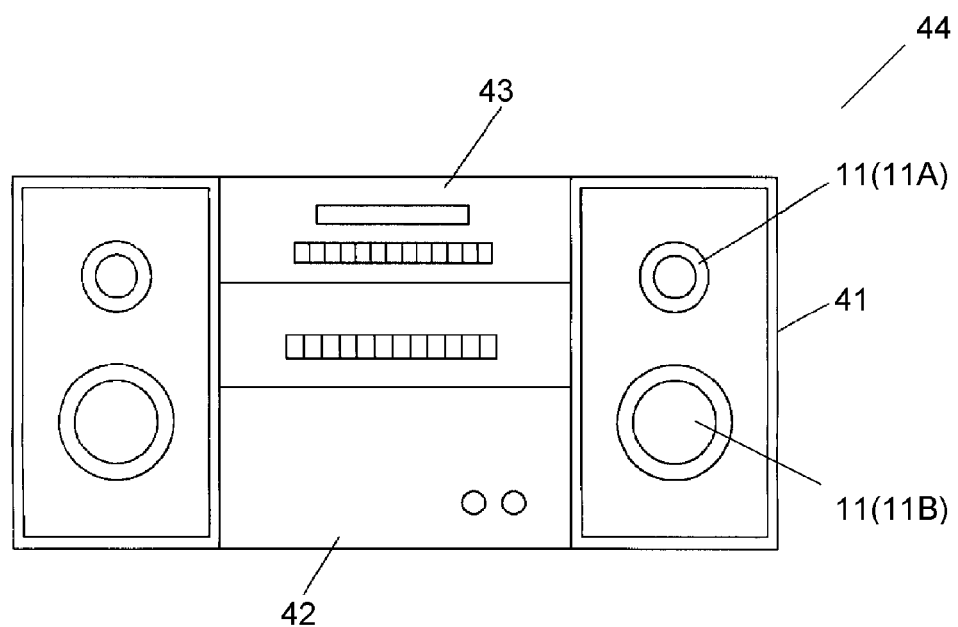
FIG. 8 is an external view of an electronic device in accordance with the exemplary embodiment of the present invention.

Hereinafter, electronic device 44 according to the exemplary embodiment is described with reference to FIG. 8. FIG. 8 is a conceptual diagram of electronic device 44. Electronic device 44 has loudspeaker 11, housing 41, and amplifier 42. Loudspeaker 11 preferably includes, for example, tweeter 11A and full-range speaker 11B. Electronic device 44 may further includes player 43.

Loudspeaker 11, amplifier 42, and player 43 are accommodated in housing 41. Player 43 outputs an electric signal to be fed into amplifier 42. Amplifier 42 amplifies the electric signal and transmits it to loudspeaker 11.

Electronic device 44 is, for example, a mini component audio system. However, electronic device 44 is not limited to a mini component system; it may be video equipment such as a liquid crystal TV and a plasma display TV, or may be information equipment such as a mobile phone and a computer.

With the structure above, electronic device 44 has an enhanced sound pressure level and an increased limit frequency in the high frequency range, and therefore loudspeaker 11 reproduces sounds with excellent quality. Thus, electronic device 44 achieves high quality in sound and product, high reliability, and low production cost.

Figure 9:
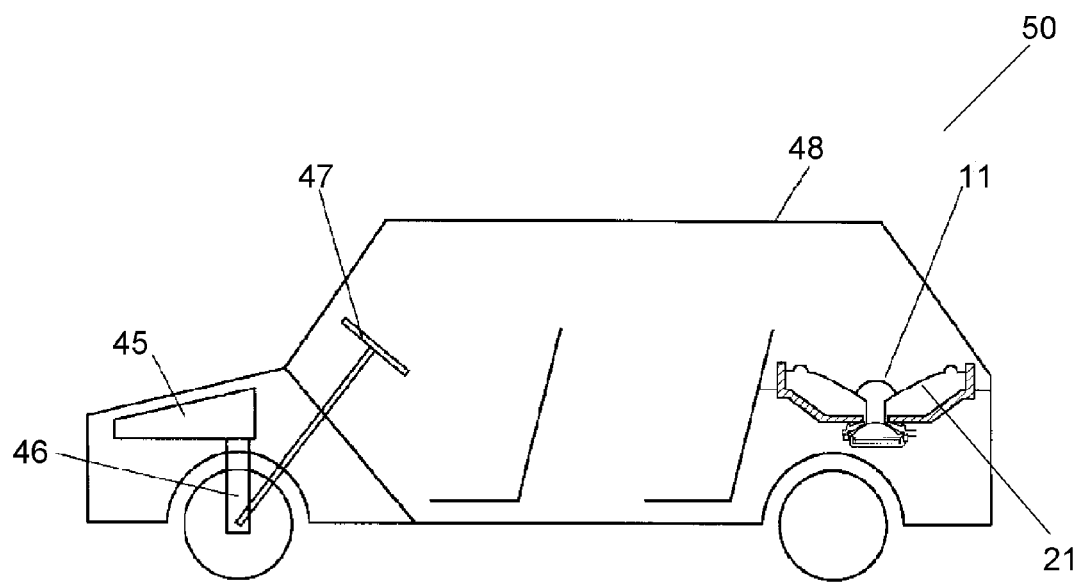
FIG. 9 is a configuration diagram of a mobile device in accordance with the exemplary embodiment of the present invention.

Next, mobile device 50 according to the exemplary embodiment is described with reference to FIG. 9. FIG. 9 is a conceptual diagram of mobile device 50. Mobile device 50 has main body 48, driving section 45, and loudspeaker 11. Driving section 45 may include power transmission section 46 and steering section 47. Steering section 47 may further include a tire and other components.

Driving section 45 and loudspeaker 11 are accommodated in main body 48. Driving section 45 generates a power for driving mobile device 45. Driving section 45 may include, for example, an engine or a motor. Power transmission section 46 transmits the power to a tire, for example. Power transmission section 46 may include a gearbox (gearhead). Steering section 47 may include, for example, a steering wheel and an accelerator pedal.

Loudspeaker 11 can be disposed, for example, on a rear tray. Loudspeaker 11 can be a part of a car navigation system or a car audio system. Other than the rear tray, loudspeaker 11 may be mounted on the front panel, the door, the ceiling, the pillar section, the instrument panel section, or the floor.

Diaphragm 21 is lighter than a resin-made diaphragm. Therefore, magnet 14D (see FIG. 2) for driving diaphragm 21 can be reduced in size; accordingly, yoke 14E and plate 14F can be formed into a small size. As a result, loudspeaker 11 can have a lightweight, thereby reducing the weight of mobile device 50. The lightweight structure contributes to improvement of fuel efficiency of mobile device 50, that is, it contributes to reduction of fossil-fuel consumption.

Mobile device 50 is, for example, a car. Mobile device 50 is not limited to a car; it may be a motorbike, a bus, a train, a vessel, or an aircraft.

INDUSTRIAL APPLICABILITY

The diaphragm of the present invention is effective in enhancing sound quality and is applicable to various types of electronic devices and mobile devices.

The invention claimed is:
1. A diaphragm comprising:
a paper base layer containing natural fibers and thermoplastic resin; and
a papermaking layer containing fibers each having a tensile elastic modulus of 150 GPa or more, and laminated on the paper base layer, wherein:
a content of the natural fibers with respect to a total weight of the paper base layer is in a range from 10 wt % to 70 wt %, inclusive,
the paper base layer has a density in a range from 0.25 $g/cm^3$ to 1.00 $g/cm^3$, inclusive,
the fibers contained in the papermaking layer are at least one type of fibers selected from the group consisting of carbon fibers, alumina fibers, stainless fibers and titanium fibers.
2. The diaphragm according to claim 1, wherein the diaphragm is a thermal press-molded body of a laminated structure formed of the paper base layer and the papermaking layer.
3. The diaphragm according to claim 2, wherein the laminated structure is a flat plate.
4. The diaphragm according to claim 1, wherein the papermaking layer contains thermoplastic resin identical to the thermoplastic resin contained in the paper base layer.
5. The diaphragm according to claim 1, wherein the papermaking layer further contains thermoplastic chemical fibers.

6. The diaphragm according to claim 1, wherein the papermaking layer is formed on at least one of surfaces of the diaphragm.

7. The diaphragm according to claim 1, wherein the thermoplastic resin contains chemical fibers.

8. The diaphragm according to claim 1, wherein the paper base layer has a skin layer formed on a surface opposite to a surface on which the papermaking layer is formed.

9. The diaphragm according to claim 1, wherein the paper base layer further contains reinforcing material.

10. The diaphragm according to claim 1, wherein the diaphragm has a dome shape.

11. A loudspeaker comprising:
a frame;
a diaphragm connected to a peripheral section of the frame and comprising:
  a paper base layer containing natural fibers and thermoplastic resin; and
  a papermaking layer containing fibers each having a tensile elastic modulus of 150 GPa or more, and laminated on the paper base layer;
a magnetic circuit connected to the frame and provided with a magnetic gap; and
a voice coil having a first end connected to the diaphragm and a second end inserted in the magnetic gap, wherein:
a content of the natural fibers with respect to a total weight of the paper base layer is in a range from 10 wt % to 70 wt %, inclusive,
the paper base layer has a density in a range from 0.25 g/cm3 to 1.00 g/cm3, inclusive,
the fibers contained in the papermaking layer are at least one type of fibers selected from the group consisting of carbon fibers, alumina fibers, stainless fibers and titanium fibers.

12. The loudspeaker according to claim 11, wherein the papermaking layer is formed on a surface opposite to a surface, to which the voice coil is connected, of the diaphragm.

13. The loudspeaker according to claim 11, wherein the papermaking layer is formed on a surface, to which the voice coil is connected, of the diaphragm.

14. An electronic device comprising:
a housing;
the loudspeaker defined in claim 11 and accommodated in the housing; and
an amplifier that is accommodated in the housing and sends an electric signal to the loudspeaker.

15. A mobile device comprising:
a main body;
a driving section mounted to the main body; and
the loudspeaker defined in claim 11 and mounted to the main body.

* * * * *